United States Patent [19]

McGeachy

[11] 4,073,311

[45] Feb. 14, 1978

[54] FLOW CONTROL VALVE

[75] Inventor: Donald E. McGeachy, Highland, Mich.

[73] Assignee: Numatics, Incorporated, Highland, Mich.

[21] Appl. No.: 749,384

[22] Filed: Dec. 10, 1976

[51] Int. Cl.² .................................................. F16K 15/14
[52] U.S. Cl. .................................... 137/513.3; 91/443; 137/599
[58] Field of Search .................. 137/513.3, 513.7, 599; 91/443

[56] References Cited

U.S. PATENT DOCUMENTS

| 1,746,855 | 2/1930 | French | 137/513.3 |
| 3,493,270 | 2/1970 | Doerfler | 137/513.3 X |

Primary Examiner—Robert G. Nilson
Attorney, Agent, or Firm—Barnes, Kisselle, Raisch & Choate

[57] ABSTRACT

A bi-directional valve for unrestricted flow in one direction and a regulable restriction for flow control in the other direction which includes an in-line housing and a two-piece valve assembly transversely positioned in said housing having a valve seat in one position, a valve to control said valve seat opening in another portion, and a ring by-pass valve on one of said portions cooperating with an annular seat on said housing, the by-pass valve being flexible to respond to fluid flow, closing in one direction against the annular seat and moving away from said annular seat when the flow is reversed.

14 Claims, 3 Drawing Figures

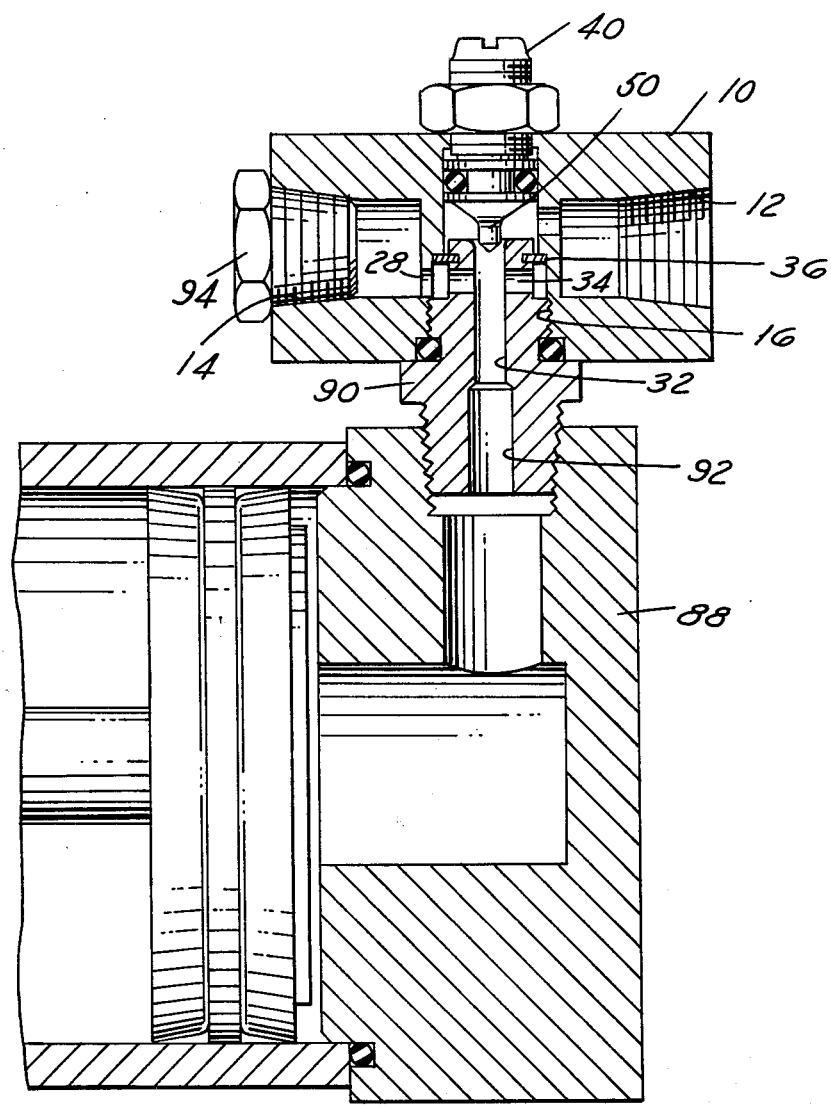

FLOW CONTROL VALVE

This invention relates to a Flow Control Valve and more particularly to a valve which may be inserted into a line in a fluid power system to regulate flow.

More specifically, the invention is directed to an in-line valve which will permit relatively unrestricted flow in one direction while regulating flow in the other direction.

It is an object of the invention to provide an inexpensive and relatively simple valve construction which requires very little machining and relatively simple parts which will operate over long periods of time without maintenance. When maintenance is required, the replacement of worm elements is a very simple task.

It will be noted that, apart from the tapped holes in the ends of the valve to be described, there is a single transverse bore which is made by a boring operation from one end only, thus simplifying the manufacture but also providing a safety feature in that a shoulder at the small end prevents withdrawal of the adjustable valve insert and thus prevents accidental removal of the plug with air pressure present.

A further object is the provision of a flow control valve which can be adjusted to a fixed flow position and which is unmoving in this position.

Other objects and features of the invention will be apparent in the following description and claims in which the invention is described and details disclosed to enable a person skilled in the valve art to practice the invention, all in connection with the best mode presently contemplated by the inventor.

Figure 1:
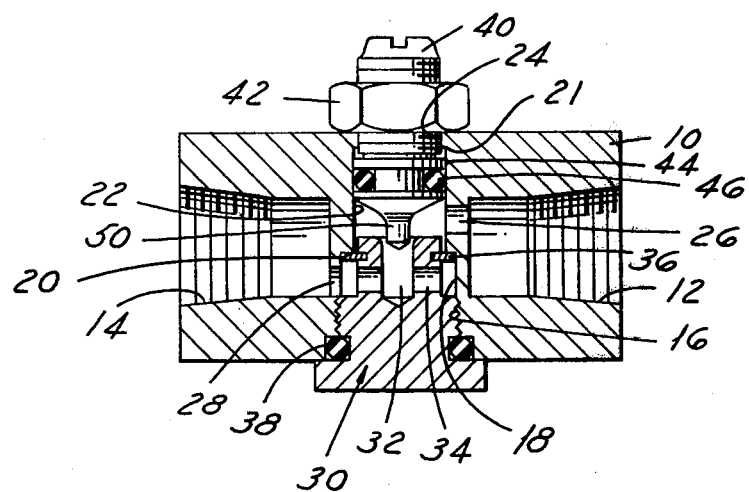

Drawings accompany the disclosure and the various views thereof may be briefly described as:

FIG. 1, a sectional view of the valve constructed in accordance with the invention.

Figure 2:
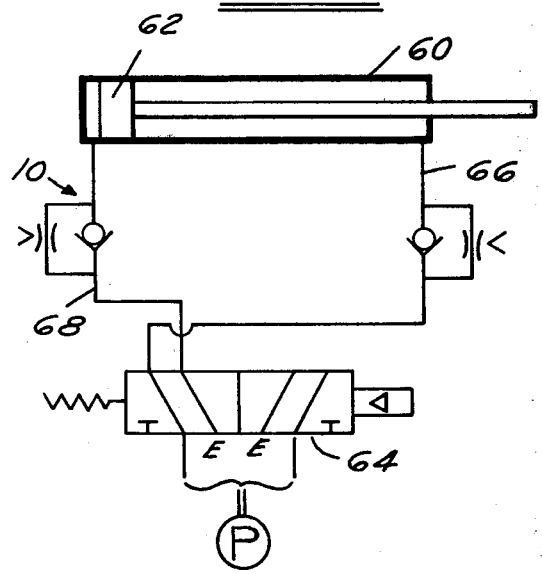

FIG. 2, a diagrammatic view of a circuit in which the valve is utilized.

FIG. 3, a view of a modified valve housing for direct mount on a cylinder head.

With reference to the drawings, a valve housing 10 is illustrated with aligned and tapped inlet-outlet openings 12 and 14 at each end. A substantially cylindrical recess is provided transversely of the axis of the housing having stepped diameters including a tapped recess 16, a straight-walled recess 18 above this tapped recess terminating in a shoulder which forms a seat 20. Above the seat 20 is a smaller straight recess 22 which terminates in a shoulder 21 and a threaded recess 24 slightly smaller than recess 22.

Passage 12 connects to the transverse cylindrical recess through an opening 26 in a wall surrounding recesses 18 and 22. Passage 14 connects to recess 18 through an opening 28 spaced axially from opening 26 and on the other side of seat 20.

A valve seat means is provided in the lower end of the cylindrical recess in the form of a plug insert 30 having an inner and outer end. The outer end 31 of plug 30 is in the form of a flanged head, hexagonal, if desired, above which is a threaded portion to fit recess 16. The inner end of plug 30 is ensmalled to be received in recess 22 with circumferential clearance and has an axial hole or orifice 32 extending inwardly and connecting to a transverse opening 34 adjacent opening 28. Near the inner end of the plug 30 is an annular recess which receives the inner periphery of a flat flexing valve ring 36, the outer periphery of the ring being positioned at the seat 20.

The ring 36 is preferably formed of an oil resistant elastomeric material such as buna "N" having a resilient characteristic which allows the outer periphery beyond the plug 30 to move axially toward and away from the seat 20. An O-ring 38 overlies the flanged head of plug 30 to provide a seal.

At the top of the valve housing 10 is a valve insert comprising a threaded head 40 in the threaded recess 24 carrying a lock nut 42 which will bear against the top of the housing 10. A body portion 44 of the valve insert, slightly larger than the threaded portion, positions in recess 22 and has an annular groove to receive O-ring 46. This body portion has a tapered end which terminates in a central projecting valve element 50 having a diameter slightly smaller than the diameter of axial passage 32 in plug 30 and provided with a slight taper for fine adjustment.

It is noted above that the head portion 44 is slightly larger than the threaded bore 24. This requires that the head 40 be inserted from the bottom of the housing 10 and also, because of shoulder 21, prevents the head from being threaded out of the top of the bore 22 by an over-zealous or untrained mechanic, thus preventing an accidental blow-out of air pressure in the pressurized line in which the valve is mounted. The shoulder 21 is high enough that the valve tip 50 can be fully withdrawn from orifice 32 before head 40 seats against shoulder 21.

In assembling the unit, the head 40 of the valve insert with the O-ring 46 is inserted into the bottom of housing 10 and threaded into place in recess 24 after which the lock-nut 42 can be screwed into place.

The valve ring 36 and O-ring 38 are assembled on to valve seat plug 30 and the valve seat screwed into the openings 16 and 18. The relative location of valve projection 50 can then be regulated relative to the valve orifice 32.

In operation, it will be seen that flow from opening 12 in housing 10 to opening 14 will deflect the periphery of flexing valve ring 36 to pass through the valve in a substantially free manner. Reverse flow will close the valve ring 36 against the seat 20 and force flow through passage 28, orifice 32 and around valve projection 50 to opening 26 and opening 12, giving a restricted flow to be determined by the setting.

In FIG. 2, a diagrammatic presentation of a system is shown with a double-ended motor cylinder 60 with piston 62 having a pressure source control valve 64. The control valves 10 shown diagrammatically are placed in the lines 66 and 68 to provide the regulated control in one direction for each end of the cylinder.

The tapered end of the head 40 blends into the projecting valve element 50 with a slight radius, and the top corner of the orifice 32 is also slightly rounded so that the head 40 can be screwed down to completely shut off the valve if occasion requires it.

In FIG. 3, a cylinder head 88 is illustrated having a tapped hole which receives a threaded bottom extension on a valve orifice plug 90 which is identical to the plug 30 of FIG. 1 with exception of the bore 92 which joins the central bore 32. One end of the main valve body is then plugged at 94 and the valve functions as described in connection with FIG. 1. This arrangement eliminates a pipe and tap connection and can reduce materially the connection space otherwise needed to install the straight in-line valve.

What is claimed as new is as follows:

1. A flow control valve assembly comprising:
   a. a housing having a single cylindrical recess extending therethrough,
   b. a valve orifice plug in one end of said recess having an inner end and an outer end and an axial passage terminating at the inner end in an orifice to be controlled, said orifice being open at one end to an inlet and at the other end to an outlet said inner end being constructed to allow flow around said plug between said inlet and outlet independently of said orifice,
   c. annular valve means retained on said inner end of said plug movable, in response to fluid flow, to close flow around said plug when flow is in one direction and to open said flow around said plug when flow is in the opposite direction, and
   d. a valve insert in the other end of said cylindrical recess having a portion movable toward and away from orifice in said plug to control a flow orifice created by the proximity of said portion and said plug,
      whereby flow through said assembly is relatively unrestricted in one direction around said plug and past said annular valve means and is restricted through said orifice in the other direction.

2. A flow control valve assembly as defined in claim 1 in which the outer end of said valve orifice plug is threaded into one end of said cylindrical recess to close that end of the recess and position said orifice, and said valve insert is threaded into and adjustably positioned in the other end of said cylindrical recess to close said recess at that end.

3. A flow control valve as defined in claim 1 in which said valve plug has an annular recess adjacent the inner end and said annular valve means is lodged in said annular recess.

4. A flow control valve as defined in claim 1 in which an annular shoulder is formed in said cylindrical recess to cooperate with the outer periphery of said annular valve means on said body of said valve seat means.

5. A flow control valve as defined in claim 4 in which the outer periphery of said annular valve means is constructed to flex axially toward and away from said shoulder in response to the direction of flow through said valve housing.

6. A flow control valve assembly as defined in claim 1 in which a shoulder is formed at said other end of said cylindrical recess in which said valve insert is located to block removal of said valve insert.

7. A flow control valve assembly as defined in claim 1 in which said valve insert is movable toward said valve plug to a degree sufficient to close said orifice and block flow through said assembly in one direction.

8. A flow control valve assembly as defined in claim 1 in which said valve orifice plug has a threaded extension outside said housing to serve as a connection for a fluid utility device, said extension having a passage connecting to said orifice in said plug.

9. A flow control valve comprising:
   a. a housing having inlet and outlet passages and a cylindrical recess between said passages connected thereto by axially spaced openings,
   b. a valve plug in one end of said recess having an inner end and an outer end and having a cross-passage open to one of the passages in said housing, an axial passage connecting said cross-passage to the inner end of said plug open to the other of said passages in said housing, said inner end being constructed to allow flow between said housing passages around said plug independently of said cross-passage and said axial passage,
   c. annular valve means retained on said inner end of said plug movable to close said cylindrical recess between said axially spaced openings in one position and to open said cylindrical recess in a second position, and
   d. a valve insert in the other end of said cylindrical recess movable toward and away from the axial passage in said plug to control a flow aperture created by the proximity of said valve plug and said valve insert,
      whereby flow through said assembly is relatively unrestricted in one direction around said plug and past said annular valve means and is restricted through said axial passage in the other direction.

10. A flow control valve assembly as defined in claim 9 in which the outer end of said valve orifice plug is threaded into one end of said cylindrical recess to close that end of the recess and position said orifice, and said valve insert is threaded into and adjustably positioned in the other end of said cylindrical recess to close said recess at that end.

11. A flow control valve as defined in claim 9 in which said valve plug has an annular recess adjacent the inner end and said annular valve means is lodged in said annular recess.

12. A flow control valve as defined in claim 9 in which an annular shoulder is formed in said cylindrical recess to cooperate with the outer periphery of said annular valve means on said body of said valve seat means.

13. A flow control valve as defined in claim 9 in which the outer periphery of said annular valve means is constructed to flex axially toward and away from said shoulder in response to the direction of flow through said valve housing.

14. A flow control valve assembly as defined in claim 9 in which a plug is inserted in one of said passages in said housing, and a fitting and passage is provided on the outer end of said plug leading to said axial passage.